United States Patent [19]

Weininger et al.

[11] 3,956,020

[45] May 11, 1976

[54] ULTRAFINE POROUS POLYMER ARTICLES

[75] Inventors: Joseph L. Weininger; Fred F. Holub, both of Schenectady, N.Y.

[73] Assignee: General Electric Company, Schenectady, N.Y.

[22] Filed: Mar. 24, 1971

[21] Appl. No.: 127,848

Related U.S. Application Data

[63] Continuation-in-part of Ser. No. 772,392, Oct. 31, 1968, abandoned, which is a continuation-in-part of Ser. No. 717,893, April 1, 1968, abandoned.

[52] U.S. Cl. ........................... 136/146; 260/2.5 M; 264/49
[51] Int. Cl.² ........................................ H01M 2/14
[58] Field of Search ................ 136/146; 260/2.5 M; 264/49, 231

[56] References Cited
UNITED STATES PATENTS

| | | | |
|---|---|---|---|
| 3,351,495 | 11/1967 | Larsen et al. | 136/146 |
| 3,376,238 | 4/1968 | Gregorian | 260/2.5 M |
| 3,432,380 | 3/1969 | Weber | 264/321 |
| 3,453,358 | 7/1969 | Hartman | 264/321 |

*Primary Examiner*—Donald L. Walton
*Attorney, Agent, or Firm*—Paul R. Webb, II; Joseph T. Cohen; Jerome C. Squillaro

[57] ABSTRACT

Solid, ultrafine porous polymer articles and processes of producing such polymer articles are described wherein a solid body of a crystalline thermoplastic polymer exhibiting at least 70 percent crystallinity or blends of such crystalline thermoplastic polymers and thermoplastic polymers exhibiting up to 65 percent crystallinity where the latter polymer is present in an amount up to 50 weight percent of the crystalline polymer is heated at a temperature of at least in its melting temperature range, a benzoate salt is incorporated therein forming a composite body, the composite body is shaped at a temperature in the range of the initial heating temperature of the polymer, the shaped composite body is cooled to room temperature forming a solid composite body, and the salt is dissolved from the solid composite body leaving the polymer as an ultrafine porous article.

12 Claims, No Drawings

ULTRAFINE POROUS POLYMER ARTICLES

This application is a continuation-in-part of our copending application, Ser. No. 772,392, filed October 31, 1968, now abandoned which is a continuation-in-part of our copending application Ser. No. 717,893, filed Apr. 1, 1968, now abandoned, which are both assigned to the same assignee as the present application.

This invention relates to a process of producing solid, ultrafine porous polymer articles and to the products produced by this process. More particularly, this invention relates to the process of incorporating uniformly into a solid body of a crystalline thermoplastic polymer exhibiting at least 70 percent or a blend of such a crystalline thermoplastic polymer and a thermoplastic polymer exhibiting up to 65 percent crystallinity, a benzoate salt, which salt is dissolved subsequently from the composite body leaving the polymer as an ultrafine porous article. More particularly, a solid body of a crystalline thermoplastic polymer or a blend of such a crystalline thermoplastic polymer and a thermoplastic polymer exhibiting up to 65 percent crystallinity is heated at a temperature of at least in its melting point range, a soluble salt (e.g., soluble in water, alcohol, or other such organic liquids) is incorporated uniformly therein, which salt has the formula

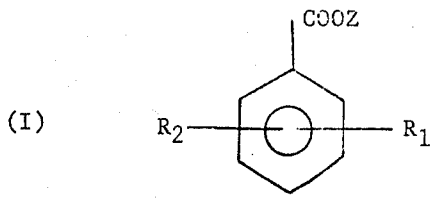

(I)

where Z is metal selected from the group consisting of alkali metals, and mixtures of such alkali metals and alkaline earth metals, $R_1$ is a radical selected from the group consisting of hydrogen, alkyl $C_{1-4}$, aryl, and halogen, and $R_2$ is a radical selected from the group consisting of hydrogen, alkyl, $C_{1-4}$, aryl, and halogen; for example, such salts include sodium benzoate, lithium benzoate, potassium benzoate, sodium benzoate and calcium benzoate, sodium para-t-butyl benzoate, and sodium parachloro benzoate, the weight of the salt is greater than 70% and no more than 85% by weight of the total weight of the salt and the polymer body, and the salt is dissolved from the polymer body resulting in a polymer article with an ultrafine porous structure.

Prior to our invention, porous structures were made by selectively dissolving a soluble solid material from a heterogeneous mixture of the soluble solid, e.g., sodium chloride, urea, sodium carbonate, sodium bicarbonate, etc., and a polymer. The above materials are not suitable since they do not provide ultrafine porous structures. The polymer has to be in sufficient quantity that a connecting network of polymer is formed so that the structure does not disintegrate when the soluble material is extracted. On extraction of the soluble solid, non-uniform large size pores are obtained because of the failure to obtain a uniform blend during the mixing operation and unfilled voids which are trapped during the milling and sheeting operation.

Another method of making porrous products porous to incorporate a thermally decomposable material into a polymer followed by heating to cause decomposition of the thermally decomposable material and expansion of the polymer into a porous structure. Such a process requires careful compounding of the composition to avoid premature decomposition, as well as careful control of the amount of material placed in the vessel in which it is to be formed, such as a mold, so that just enough material is added to completely fill and shape the formed, porous article. Furthermore, thermally decomposable materials are generally dangerous to handle and relatively expensive, and generally used to form closed pores.

Other methods have also been used, e.g., volatilization of a solvent, use of an extractable plasticizer, sintering, bonding with an adhesive, etc., but these methods also fail to give the very uniform, ultrafine porous structure and ease of control that we obtain by our process.

We have now found a simple method for making ultrafine, porous polymer articles which essentially eliminates all of the drawbacks of the prior art processes employing a heterogeneous mixture of a soluble solid material and a polymer body. Our process permits the making of solid, ultrafine porous polymer articles which are polymer articles having a porosity of about 40 percent and greater provided by ultrafine and substantially uniformly distributed continuous and interconnecting pores of diameter from 40 to 120 Angstroms.

Our process is applicable to the making of ultrafine porous articles from solid, crystalline thermoplastic polymers which are defined as exhibiting more than 70 percent crystallinity, and from such crystalline polymers which are blended with up to 50 weight percent thermoplastic polymers which are defined as exhibiting less than 65 percent crystallinity. The particular salts of Formula I provide unique media for forming the pores. It will be readily apparent to those skilled in the art that the particular polymer or copolymer chosen must be one which had enough rigidity that the reticulated structure does not collapse due to the resin flowing or contracting after removal of the salt at temperatures below the maximum temperature at which the ultrafine porous polymer article will be used. In other words, the polymer should not cold flow in the temperature range of its use as an ultrafine porous article, should not contract due to plastic or elastic memory after the sodium benzoate is extracted, and should be one that is capable of forming a self-supporting reticulated structure. In practicing our invention, we incorporate the salt of Formula I into the solid crystalline polymer or polymer blend by suitable means; for example, the two may be blended together in the dry state but preferably are blended together by heating and mixing on hot compounding rolls or otherwise suitably mixed, for example, by use of a Banbury or other suitable blender, etc., at elevated temperatures in the melting point temperature range of the polymer where the two materials are mutually insoluble to obtain a completely uniform distribution of the salt in the polymer forming a composite body.

As far as we can determine solid, crystalline thermoplastic polymers which exhibit 70 percent crystallinity and have a melting temperature range of 100°C to 270°C and such crystalline polymers which are blended with up to 50 weight percent thermoplastic polymers which exhibit less than 65 percent crystallinity form a heterogeneous mixture at a temperature of at least in the melting temperature range of the crystalline polymer. The salt and polymer form an evenly dispersed heterogeneous mixture. The mixture is shaped by sheeting, molding, calendering, or extruding to form it into the desired shaped object, using a temperature in the range of the initial heating temperature of the polymer. The shaped body is cooled to room temperature where the body is a solid having two intermixed, separate materials in which the polymer forms the ultrafine porous structure and the salt fills the pores. The polymer body is a solid, integral, structural network or reticulated structure surrounding the entrapped salt. Since the salt is a separate material, it can be dissolved out leaving the polymer article as a unitary, ultrafine porous solid.

The salt is extracted with a solvent, such as water, in which the salt is soluble but the polymer body is insoluble at the temperature used for the extraction. In general, for convenience's sake and ease of further processing, we cool to ambient temperature. The choice of solvent is governed chiefly by the procedure chosen for extraction of the salt. The only requirement it must meet is that it dissolve the salt but not the polymer at the temperature used for extraction. Although other solvents than water can be used to dissolve the salt, for example, methyl alcohol, ethyl alcohol, and other solvents which do not dissolve the polymer at the temperature used for extraction, for convenience we generally use water or one of the readily available, low cost, low boiling solvents, e.g., alcohols, to extract the salt from the polymer. A condensing vapor phase or other suitable method can also be used to remove the salt. The salt and solvent may be recovered and reused by evaporation, spray-drying, etc., of the solution of the salt in the solvent.

In practicing our invention, solid crystalline thermoplastic polymers which exhibit 70 percent crystallinity and have a melting point temperature range of 100°C to 270°C can be used. Such crystalline thermoplastic polymers can have blended therewith thermoplastic polymers which exhibit up to 65 percent crystallinity in an amount up to 50 weight percent. Polymers which exhibit up to 65 percent crystallinity and blends of such polymers about 50 weight percent with crystalline polymers are not useful and will not produce the ultrafine porous polymer articles of our invention. Specific examples of solid crystalline thermoplastic polymers include crystalline polyolefin copolymers, crystalline polyethylene, crystalline polypropylene, crystalline poly 4 methyl pentene, crystalline isotatic polystyrene, crystalline olefin copolymers, etc. Specific examples of solid thermoplastic polymers which exhibit up to 65 percent crystallinity, which can be blended with crystalline thermoplastic polymers in amounts up to 50 weight percent in the practice of our invention include polyethylene, polypropylene, etc.

We found unexpectedly that salts of Formula I were solid, water soluble materials which were suitable in our process to produce the unique results of an ultrafine porous polymer article with a porosity of 40 percent and greater provided by ultrafine and substantially uniformly distributed continuous and interconnecting pores of diameter from 40 to 120 Angstroms. Such a salt such as sodium benzoate is used in its standard commercial size. An electron micrograph showed such salt to be in needle-like crystals, most of which were compacted into bundles of thicker strands. The crystals had a minimum length of 1 micron. The more important width of crystal particles varied from a minimum of about 800A to about 5000A. Other prior art materials, such as sodium carbonate and sodium chloride, produced porous polymers with coarse pore sizes with an average range of 10,000 to 100,000 Angstroms. Other prior art materials, such as sodium bicarbonate and starch failed to produce a uniform porous material.

We have also determined that ultrafine porous articles can be obtained with a solid crystalline thermoplastic polymer or blend as above described and a salt of Formula I only when the concentration of the salt in the polymer is greater than 70%, and no more than 85% by weight of the total weight of the salt and the polymer. If the amount of salt is substantially less than 70%, it is difficult to extract the salt from the polymer after it has been incorporated by heating, apparently because the polymer completely surrounds the salt and prevents its extraction. If the amount of salt is substantially greater than 85%, the heterogeneous mixture becomes too difficult to process. Softness and flexibility are dependent on the polymer. For example, the ultrafine porous articles from crystalline polystyrene are hard and rigid while those from crystalline polyethylene are soft and flexible. There is a decrease in thickness of the material when the salt is extracted from the composition. Because the pores are formed by the salt phase separating out from the heterogeneous mixture, the polymer structure with the continuous ultrafine pores obtained by our process is unique and entirely different from that obtained by any of the prior art processes. Because of the uniqueness of this process, which involves crystallization during pore formation, the process yields ultrafine pores which are significantly smaller than the particulate cross-section of the added salt.

The polymer can be cross-linked by high energy electron irradiation prior to or subsequent to dissolving the salt therefrom to result in an insoluble, cross-linked structure.

The high energy electron irradiation is set forth as a total dose which is defined as the total number of roentgen units applied in the irradiation operation. A roentgen unit, as usually defined, is the amount of irradiation that produces one electrostatic unit of charge per cubic centimeter of air under standard temperature and pressure conditions, and as employed here, refers to the amount of electron irradiation measured with an air-equivalent ionization chamber at the position of the surface of the polymer. While the total dose may be varied, we prefer to employ a total dose of $50 \times 10^6$ roentgen units at room temperature. A further discussion of high energy electron irradiation and suitable apparatus employed therefor is described, for example, in U.S. Pat. No. 2,763,609 issued Sept. 18, 1956, and U.S. Pat. No. 2,858,259 issued Oct. 28, 1958, both of which patents are assigned to the same assignee as the present application.

The following examples show that the type of ultrafine porous polymers obtained by our method are unique. Because of their controlled porosity and physical and chemical properties, the ultrafine porous polymers of this invention have many and varied uses. Sheets and laminates make ideal battery separators for both primary and secondary batteries. Of the secondary batteries, the lead-acid battery is one of the most important.

Separators for lead acid batteries are described, for example, in "Storage Batteries" by George Wood Vinal, published by John Wiley & Sons, Inc., New York, Fourth Edition, 1955, at pages 51–65. Such thin porous separators which are placed between alternating positive and negative plates in lead acid batteries have provided the development of compact, portable batteries. Prior to the use of these pore separators, rods of glass or hard rubber or perforated and corrugated hard rubber sheets were inserted between the plates of the cells to prevent possible short circuits through buckling of the plates. The object of the separator is to prevent metallic conduction between the plates of opposite polarity while freely permitting electrolytic conduction. Separators are presently made of wood veneer, perforated and slotted rubber, microporous rubber fibers, glass mats and of plastics. This latter category includes microporous plastics, fibrous materials impregnated with insoluble resins, regenerated cellulose film, various fiber materials, woven glass, and porous vitreous materials.

The ultrafine porous polymer articles of the present invention provide thin porous separators which are desirable in a lead acid battery to more closely position the plates. Additionally, the present ultrafine porous polymers lend themselves readily to various configurations in designing lead acid batteries. As it will be apparent the separators of the present invention can be provided with a wide variety of filler materials to produce the hydrophilic nature of the separator. Under certain circumstances, pores of diameter from 40 to 600 Angstroms are desirable in such separators for lead acid batteries.

Additionally, the present ultrafine porous polymers can be used to make molded articles of any desired shape either alone or mixed with various fillers, such as wood flour, diatomaceous earth, clay, carbon black, silica, fibrous materials such as glass fibers, asbestos fibers, cotton fibers, etc., to make sealed molded parts which are buoyant and will float in water, to make filters or filter media for use in process equipment to clarify solutions, to make cigaret filters, etc., or can be used as a matrix to absorb liquids such as dye solutions, inks, etc., to serve as a reservoir for example as in the making of a stamp pad, etc.

The compound containing the salt of Formula I can be used to laminate, coat or impregnate one or more surfaces of a substrate material, for example, non-woven fabric or other fibrous material, etc., or a solid surface, for example, metal sheets, wood, etc., or can be used to extrude a coating over another material, for example, wire, threads, tubes, etc., to leave after extraction of the salt with water, an ultrafine porous coating on these articles which is excellent thermal insulation. Sheets or blocks of the ultrafine porous plastic may likewise be used to thermally insulate other objects such as pipe, refrigerators, etc.

Metal powders, conductive solids. e.g., conductive carbons, metallized non-conductors, etc. may be incorporated into the solid thermoplastic polymer along with sodium benzoates to make an ultrafine porous conductive article, e.g., sheets, after extraction of the salt, which are suitable for electrodes in electromotive cells, e.g., fuel cells, decorative articles, electrical conductors, etc. Such structure would be ideally suited for such applications as, for example, water-treatment, the making of a solid electrolyte for low temperature fuel cells.

In order that those skilled in the art may more readily understand our invention, the following examples are given by way of illustration and not by way of limitation. In these examples, the ratios of polymers to soluble solids are set forth as weight ratios.

In the following examples, various materials which were formed were tested subsequently to determine their porosity, electrical conductivity, gas flow, and pore measurements. When particular materials of the examples are described as having been tested for one of the above properties, the same testing procedure was used.

The resistivity ratio of the polymer material is calculated by dividing the resistivity of an electrolytic solution with a polymer membrane in place by the resistivity of the same electrolytic solution above. For good conductivity, the resistivity ratio should be close to 1. A ratio of 1 indicates no hindrance to electrical conductivity of the electrolyte solution due to the presence of the membrane in the electrolyte solution.

A ratio, which is close to 1, indicates that the polymer has a continuous pore structure. The resistivity of a potassium chloride electrolyte solution is measured. The polymer is positioned in the same solution as a membrane and a platinum electrode is placed on each side of the membrane. The resistivity of the solution with the polymer membrane therein is then measured. The ratio is calculated as set forth above.

Porosity of the polymer material is readily obtained by determining the difference in density between the initial impervious polymer and the leached polymer divided by the density of the initial impervious polymer multiplied by 100.

Gas flow measurements were made by flowing nitrogen gas at 20 pounds per square inch gauge through a test fixture which exposed 13.5 square centimeters of the leached material. This gave a measure of gas permeability in terms of milliliters of gas passing through the leached material per minute per square centimeter of surface area.

High porosity of about 40% or greater and a low gas flow within a range of about 20 to 200 milliliters per minute as described above discloses that the porous polymer article has an ultrafine porous structure with substantially uniformly distributed continuous and interconnecting pores. Such a porous structure is the type discussed and claimed in the present application. A porous polymer, which has both high porosity and a high gas flow, is a structure with many large pores but which is not an ultrafine porous structure. A polymer, which shows low porosity and a low gas flow, is a structure which has very few pores which are neither continuous nor interconnected. Such a structure is not an ultrafine porous polymer.

Measurements were also made by producing electron micrographs of the material. These micrographs showed the configuration of the pores and actual measurements to be made of the pore dimensions.

The melting temperature range of crystalline polyethylene, crystalline polypropylene, and polyethylene exhibiting 65 percent crystallinity were obtained by means of a differential scaning calorimeter. Crystalline polyethylene and crystalline polypropylene had melting ranges of 103° to 137°C and 136° to 169°C, respectively. Polyethylene exhibiting 65 percent crystallinity had a melting point range of 100° to 125°C.

EXAMPLES 1–2

In each of Examples 1–2, the solid thermoplastic polymer was polyethylene which exhibited 65 percent crystallinity. Sodium benzoate, a soluble solid from Formula I of applicants' invention, was employed for incorporation into each of the above thermoplastic polymers in a weight ratio of polymer to solid of 1:4.

In each of these examples, the sodium benzoate was incorporated in an attempt to produce an ultrafine porous polymer article in which the polymer has a high porosity of about 40% and greater provided by ultrafine in substantially uniformly distributed continuous and interconnecting pores of diameter from 40 to 120 Angstroms.

In the preparation of each of the above materials, the polyethylene exhibiting 65 percent crystallinity was milled initially on hot differential rolls at a temperature of 130°C. Sodium benzoate from Formula I was then added and milling continued thereby forming a heterogeneous blend of the two materials. Each of the above materials for Examples 1 and 2 were sheeted at a temperature of 110°C and removed from the mill at 90°C in sheets of about 4 mils thickness. After cooling these sheets were washed in running water at a temperature in a range from about 40° to 50°C for about 8 hours.

As opposed to a high porosity of about 40 percent and greater provided by this invention the respective porosity of these two sheets in Examples 1 and 2 were only 6.4 and 2.7 percent porous, respectively. Thus, the employment of a non-crystalline thermoplastic polymer is not suitable for preparing the ultrafine porous polymer articles of applicants' invention.

EXAMPLES 3-9

In each of Examples 3-9, the solid thermoplastic polymer was crystalline polyethylene. In Example 9, the polymer was crystalline polypropylene. Sodium benzoate, a soluble solid from Formula I of applicants' invention was employed for incorporation into the above crystalline thermoplastic polymers. The ratio of the polymer to the sodium benzoate is set forth below in Table I.

TABLE I

| Example No. | Ratio Polymer/Solid |
|---|---|
| 3 | 1:2 |
| 4 | 1:2.4 |
| 5 | 1:3.5 |
| 6 | 1:4 |
| 7 | 1:4.75 |
| 8 | 1:3.5 |
| 9 | 1:3.5 |

In each of these examples, sodium benzoate in a ratio as set forth above in Table I was incorporated into a solid thermoplastic polymer body of polyethylene or polypropylene in an attempt to produce an ultrafine porous polymer article in which the polymer has a high porosity of about 40% and greater provided by ultrafine and substantially uniformly distributed continuous and interconnecting pores of diameter from 40 to 120 Angstroms.

In the preparation of the materials described above and shown in Table I, the crystalline polyethylene was milled initially on hot differential rolls at a temperature of 140°C. The crystalline polypropylene was milled initially in the same manner but at a temperature of 180°C. Sodium benzoate from Formula I was then added and the milling continued thereby forming a heterogeneous blend of the two materials. Each of the materials set forth in the above Examples 3-8 were sheeted off at a temperature of 127°C to form sheets of about 5 mils thick. The material set forth in Example 9 was sheeted at 175°C. After cooling, these sheets were washed in running water at a temperature in a range from 45°C to 50°C for about 8 hours.

The following Table II shows that the polymer articles of Examples 3-9 were made in accordance with applicants' invention. Example 3 was made with less than 70% of sodium benzoate and therefore below the concentration of the salt required to produce an ultrafine porous polymer.

TABLE II

| Example No. | Porosity | Resistivity Ratio | Gas Flow ml/min/cm$^2$ |
|---|---|---|---|
| 3 | — | 334.00 | — |
| 4 | 46% | 1.33 | — |
| 5 | 52% | 1.21 | 6.45 |
| 6 | 49% | 1.31 | 11.85 |
| 7 | 48% | 1.44 | 3.03 |

Examples 8 and 9 were examined by making electron micrographs thereof. Each micrograph showed the material to have ultrafine pore diameters of the order of 100 Angstroms or less.

EXAMPLES 10-13

In each of Examples 10-13, the solid thermoplastic polymer was a blend of polyethylene exhibiting 65 percent crystallinity and crystalline polyethylene. Sodium benzoate, a soluble solid from Formula I of applicants' invention was employed for incorporation into the above thermoplastic polymers in a ratio of 1 polymer to 4 sodium benzoate. The ratio of the polymer exhibiting 65 percent crystallinity to the crystalline polymer is set forth below in Table III.

TABLE III

| Example No. | Ratio of Polymer with 65 Percent Crystallinity/ Crystalline Polymer |
|---|---|
| 10 | 1:9 |
| 11 | 2:8 |
| 12 | 3:7 |
| 13 | 5:5 |

In each of these examples, sodium benzoate in a 4:1 ratio was incorporated into a solid thermoplastic polymer blend of polyethylene exhibiting 65 percent crystallinity and crystalline polyethylene as set forth above in Table III in an attempt to produce an ultrafine porous polymer article in which the polymer has a high porosity of about 40% or greater provided by ultrafine and substantially uniformly distributed continuous and interconnecting pores of diameter from 40 to 120 Angstroms.

In the preparation of the materials described above and shown in Table II, the polyethylene with 65 percent crystallinity and crystalline polyethylene were mixed together to form a blend which was milled initially on hot differential rolls at a temperature of 140°C. Sodium benzoate from Formula I was then added and the milling continued thereby forming a heterogeneous blend of the polyethylenes and the sodium benzoate. Each of the materials set forth in the above Examples 10-13 were sheeted off at a temperature of 127°C to form sheets of about 5 mils thick. After cooling, these sheets were washed in running water at a temperature in a range from 45°C to 50°C for about 8 hours.

The following Table IV shows that the polymer articles of Examples 10–13 were made in accordance with applicants' invention.

TABLE IV

| Example No. | Porosity | Resistivity Ratio | Gas Flow ml/min/cm² |
|---|---|---|---|
| 10 | 51 | 2.1 | 3.33 |
| 11 | 46 | 3.2 | 2.22 |
| 12 | 43 | 3.9 | 1.11 |
| 13 | 41 | 5.1 | 0.25 |

EXAMPLES 14–19

In each of Examples 14–16 and 18–19, the solid thermoplastic polymer was crystalline polyethylene. In Example 17, the polymer was crystalline polypropylene. The composition and the weight ratio employed in Examples 14–19 are set forth below in Table V.

TABLE V

| Example No. | Composition and Weight Ratio |
|---|---|
| 14 | 1 PE:4 sodium chloride |
| 15 | 1 PE:4 starch |
| 16 | 1 PE:4 sodium carbonate |
| 17 | 1 PP:3 sodium benzoate: 1 sodium carbonate |
| 18 | 1 PE:4 urea |
| 19 | 1 PE:4 sodium bicarbonate |

The object of each of the Examples 14–19 was to incorporate a solid into a solid thermoplastic polymer to produce a porous polymer and particularly to produce an ultrafine porous polymer article of the type of applicants' invention set forth above in Examples 4–9 in which the polymer article has a high porosity of about 40 percent and greater provided by ultrafine and substantially uniformly distributed continuous and interconnecting pores of diameter from 40 to 120 Angstroms.

In the preparation of the materials shown above in the Examples in Table V, the polyethylene was milled initially on hot differential rolls at a temperature of 140°C. The polypropylene was milled initially in the same manner but at a temperature of 180°C. Each of the soluble solids was then added and the milling continued in an attempt to form a heterogeneous blend of the two materials. In Example 17, a second soluble solid, sodium carbonate, was added to the polypropylene sheet. The materials set forth in Examples 14, 15 and 16 were each sheeted off at a temperature of 127°C to form sheets of about 5 mils thick. The sheeting temperature of Example 17 was 175°C. After cooling these sheets were washed in running water at a temperature between 45°C and 50°C for about 8 hours.

With Examples 18 and 19 it was impossible to incorporate the soluble solid and the polyethylene into a heterogeneous blend. Also, it was not possible to form these materials into sheets which could be removed and subsequently leached. With Example 18, the above desired ratio set forth in Table V was attempted. It was impossible to disperse that ratio of urea into the polyethylene. Similarly, it was attempted to incorporate the sodium bicarbonate of Example 19 in the ratio set forth in Table V into the polyethylene. It was impossible to even incorporate a ratio of 2 to 1 of the solid in the polyethylene. Thus, no sheets were formed from these materials.

The sheet formed from Example 14 prior to leaching was brittle, had cracks and strong mill marks. Additionally, instead of a porous structure or an ultrafine porous structure, pores were visible to the eye at the location of the mill marks after leaching had been accomplished. Subsequently, the resistivity ratio was calculated at 1.73. The electrical conductivity was low, therefore showing that there was some non-continuous pores. The porosity was 68% and the gas flow was 1444.44 ml/min/cm² at 20 psi.

The sheet formed from Example 15 prior to leaching was brittle, crinkled and impossible to sheet out smoothly. After leaching, the sheet was still brittle.

The sheet formed from Example 16 had a good appearance subsequent to sheeting. As in Example 14, the resistivity ratio of the sheet was small. The sheet, when it was subjected to the gas flow test, disclosed a high gas flow rate. This latter test disclosed that the sheet, while it had a good appearance, had large pores and some of these pores were non-continuous. In view of the good appearance of the sheet, an electron micrograph was also made. This micrograph showed the pores in the sheet to be of irregular shape and of a size from 30,000 Angstroms in one direction to 90,000 Angstroms in the other direction.

Sheet number 17 had a smooth, unwrinkled appearance, but electron micrograph measurement disclosed large pores of a size from 20,000 Angstroms in one direction to 30,000 Angstroms in the other direction. This sheet exhibited a porosity of 54%, low resistivity ratio, and small gas flow. The introduction of even the small portion of the sodium carbonate provided the larger pore diameter in the polymer.

EXAMPLES 20–24

In each of Examples 20–24, the solid thermoplastic polymer was crystalline polyethylene. The composition and the weight ratio employed in Examples 20–24 are set forth below in Table VI.

TABLE VI

| Example No. | Composition and Weight Ratio |
|---|---|
| 20 | 1 PE:4 lithium benzoate |
| 21 | 1 PE:4 potassium benzoate |
| 22 | 1 PE:3.5 magnesium benzoate |
| 23 | 1 PE:3.5 calcium benzoate |
| 24 | 1 PE:2.5 sodium benzoate: 1 calcium benzoate |

In the preparation of the materials shown above in the examples in Table VI, the crystalline polyethylene was milled initially on hot differential rolls at a temperature of 140°C. Each of the soluble solids was then added and the milling continued in an attempt to form a heterogeneous blend of the two materials. In Example 24, a second soluble solid, calcium benzoate, was added to the polyethylene polymer. The materials set forth in Examples 20–24 were sheeted off at a temperature of 127°C to form sheets of about 5 mils thick. After cooling, these sheets were washed in running water at a temperature between 45°C and 50°C for about 8 hours.

The object of each of the Examples 20–24 was to incorporate a soluble solid into a solid crystalline thermoplastic polymer to produce a porous polymer and particularly to produce an ultrafine porous polymer article of the type of applicants' invention in which the polymer has a high porosity of about 40 percent and greater provided by ultrafine and substantially uniformly distributed continuous and interconnecting pores of diameter from 40 to 120 Angstroms. Examples 20, 21 and 24 produced the ultrafine porous polymer of applicants' invention while Examples 22 and 23 did not produce such a structure.

The following Table VII sets forth the porosity, resistivity ratio, and gas flow for the polymers of Examples 20–24.

TABLE VII

| Example No. | Porosity | Resistivity Ratio | Gas Flow ml/min/cm$^2$ |
|---|---|---|---|
| 20 | 59% | 1.72 | 2.74 |
| 21 | 56% | 1.39 | 7.41 |
| 22 | 64% | 1.17 | 56.30 |
| 23 | 67% | 1.23 | 71.11 |
| 24 | 61% | 1.22 | 11.85 |

EXAMPLES 25–26

In each of Examples 25–26, the compositions and the ratio of the crystalline polymer to the salt are set forth below in Table VIII.

TABLE VIII

| Example No. | Ratio Polymer/Solid |
|---|---|
| 25 | 1 ethylene-butylene co-polymer: 3.5 sodium benzoate |
| 26 | 1 polyethylene:4 sodium para-t-butyl benzoate |

In each of these examples, the salt in a ratio as set forth above in Table VIII was incorporated into the solid crystalline thermoplastic polymer body and produced an ultrafine porous polymer article in which the polymer had a high porosity of about 40 percent and greater provided by ultrafine and substantially uniformly distributed continuous and interconnected pores of diameter from 40 to 120 Angstroms.

In the preparation of the materials described above and shown in Table VIII, the thermoplastic polymers were milled initially on hot differential rolls as described previously in the above Examples at a temperature of 140°C. The salt was then added and the milling continued thereby forming a heterogeneous blend of the two materials. Each of the materials set forth in the above Examples 25–26 were sheeted off at a temperature of 127°C to form sheets of about 5 mils thick. After cooling, these sheets were washed in running water at a temperature in a range from 45°C to 50°C for about 8 hours.

The following Table IX sets forth the porosity, resistivity ratio, and gas flow for the polymers of Examples 25–26.

TABLE IX

| Example No. | Porosity | Resistivity Ratio | Gas Flow ml/min/cm$^2$ |
|---|---|---|---|
| 25 | 56% | 1.17 | 10.96 |
| 26 | 55% | 1.79 | 2.22 |

EXAMPLES 27–31

In these examples, sodium benzoate was incorporated uniformly into crystalline polyethylene by milling on hot differential rolls at a temperature of 140°C as described above in Examples 3–8. The ratio of polyethylene to sodium benzoate is set forth below in Table X.

TABLE X

| Example No. | Ratio Polyethylene/Salt |
|---|---|
| 27 | 1:3.5 |
| 28 | 1:4 |
| 29 | 1:3 |
| 30 | 1:3.5 |
| 31 | 1:4 |

The material was sheeted off at a temperature of 127°C to form sheets of about 5 to 10 mils thick. After cooling, the sheets from Examples 29, 30 and 31 were cross-linked by high energy electron irradiation at room temperature with $50 \times 10^6$ roentgen units from a 1.5 Mev electron beam. The sheets from Examples 27 and 28 were not irradiated. All of the sheets were then washed as described in previous Examples 3–8. The resistivity ratio of Examples 27–31 is set forth below in Table XI.

TABLE XI

| Example No. | Resistivity Ratio |
|---|---|
| 27 | 1.05 |
| 28 | 1.17 |
| 29 | 2.09 |
| 30 | 2.09 |
| 31 | 1.69 |

EXAMPLE 32

An ultrafine porous polymer sheet of substantially uniform thickness approximating 5 mils was prepared in accordance with the procedures of Examples 3–8 wherein sodium benzoate was incorporated uniformly in crystalline polyethylene thereby providing a ratio of 1 polyethylene to 4 sodium benzoate. The opaque sheet was placed in a typewriter and a series of letters and numerals typed thereon. The sheet was then visually examined and it showed that the opaque sheet was transformed to a transparent material in the areas where the indicia had been placed thereon by pressure from the typewriter keys. Thus, the subject material exhibited pressure sensitivity.

The sheet was then employed in a conventional way in an electrostatic printing machine, such as a Xerox printing machine to attempt to make copies thereof. The copies which were formed from the ultrafine porous sheet disclosed that the letters and numerals forming the transparent part of the sheet were reproduced on the copies. The remainder of the sheet, which was opaque, showed as white area on the copies.

EXAMPLE 33

An ultrafine porous polymer sheet was produced in accordance with the procedures of Examples 3–8 wherein sodium benzoate was incorporated uniformly in the crystalline polyethylene. The material had a ratio of 1 polyethylene to 4 sodium benzoate. The ultrafine porous polymer sheet, which was produced by this method, was subjected to heat to determine heat sensitivity. Pieces of the sheet which were exposed to heat treatment changed from opaque to transparent at a temperature of about 100°C. Additionally, pieces of the same sheet had associated pieces of dark paper affixed on one side thereof. Since the pieces of the sheet were opaque, the dark material behind the sheet was not particularly visible to the naked eye. Some of these pieces were exposed in a similar manner to heat at a temperature of about 100°C. At this temperature, the opaque sheet changed to a transparent material whereupon the dark paper material or backing could be seen clearly with the naked eye.

Additional pieces of the initial sheet with the dark paper backing affixed thereto were attached to photoflash bulbs and to the interior surface of photoflash cubes, which employ presently 4 photoflash bulbs within a plastic casing. Upon exposure of the bulbs and the photoflash cubes, the opaque material changed to transparent thereby exposing the dark backing. In this manner, it was possible to determine readily the dark backing which showed that the bulb or the bulb in that segment of the cube had been used.

Obviously, other modifications and variations of the present invention are possible in light of the above teachings. It is therefore to be understood that changes may be made in the particular embodiments of the invention described which are within the full intended scope of the invention as defined by the appended claims.

What we claim as new and desire to secure by Letters Patent of the United States is:

1. The method of making an ultrafine, porous polymer article having a porosity of 40% and greater provided by ultrafine and substantially uniformly distributed continuous and interconnecting pores of diameter from 40 to 120 Angstroms which consists of heating a solid polymer body selected from the group consisting of crystalline thermoplastic polymers exhibiting at least 70 percent crystallinity and blends of such crystalline thermoplastic polymers and thermoplastic polymers exhibiting up to 65 percent crystallinity wherein the polymer exhibiting up to 65 percent crystallinity is present in an amount up to 50 weight percent of the crystalline polymer at a temperature of at least in its melting temperature range, forming a composite body by incorporating uniformly therein a salt having the formula

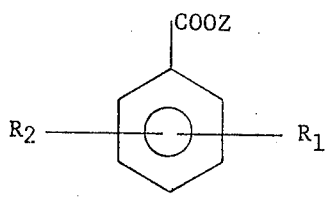

where Z is metal selected from the group consisting of alkali metals, and mixtures of such alkali metals and alkaline earth metals, $R_1$ is a radical selected from the group consisting of hydrogen, alkyl $C_{1-4}$, aryl, and halogen, and $R_2$ is a radical selected from the group consisting of hydrogen, alkyl $C_{1-4}$, aryl, and halogen; the weight of the salt being greater than 70% and no more than 85% by weight of the total weight of the composite body, shaping the composite body at a temperature in the range of the initial heating temperature of the polymer, cooling the shaped composite body to room temperature, forming a solid composite body, and dissolving the salt from the solid composite body leaving the polymer as an ultrafine porous article.

2. The method of claim 1, wherein the polymer body is a crystalline polymer of ethylene.

3. The method of claim 1, wherein the polymer body is a crystalline polymer of propylene.

4. The method of claim 1, wherein the polymer body is crystalline polyolefin copolymers.

5. The method of claim 1, wherein the polymer body is a blend of crystalline polyethylene and polyethylene exhibiting up to 65 percent crystallinity and the polyethylene exhibiting up to 65 percent crystallinity is present in an amount up to 50 weight percent of the crystalline polyethylene.

6. The method of claim 1, wherein the composite body is cross-linked prior to dissolving the salt therefrom.

7. The method of claim 1, wherein the polymer article is cross-linked after the salt has been dissolved therefrom.

8. A solid thermoplastic polymer article of a polymer material selected from the group consisting of crystalline thermoplastic polymers exhibiting at least 70 percent crystallinity and blends of such crystalline thermoplastic polymers and thermoplastic polymers exhibiting up to 65 percent crystallinity wherein the thermoplastic polymer exhibiting up to 65 percent crystallinity is present in an amount up to 50 weight percent of the crystalline polymer having a porosity of 40 percent and greater provided by ultrafine and substantially uniformly distributed continuous and interconnecting pores of diameter from 40 to 120 Angstroms.

9. The article of claim 8, in which the article is a sheet of substantially uniform thickness.

10. The article of claim 8, in which the thermoplastic polymer is a blend of crystalline polyethylene and polyethylene exhibiting up to 65 percent crystallinity, and the polyethylene exhibiting up to 65 percent crystallinity is present in an amount up to 50 weight percent of the crystalline polyethylene.

11. The article of claim 9, in which the sheet is a battery separator.

12. In a lead acid battery with a plurality of alternating positive and negative plates, the combination therewith of a battery separator positioned between each alternating positive and negative plate, each of the battery separators consisting of a polymer material selected from the group consisting of crystalline thermoplastic polymers exhibiting at least 70% crystallinity and blends of crystalline thermoplastic polymers and thermoplastic polymers exhibiting up to 65 percent crystallinity wherein the thermoplastic polymer exhibiting up to 65 percent crystallinity is present in an amount up to 50 weight percent of the crystalline polymer having a porosity of 40 percent and greater provided by ultrafine and substantially uniformly distributed continuous and interconnecting pores.

* * * * *